(12) United States Patent
Yamauchi et al.

(10) Patent No.: US 10,267,490 B2
(45) Date of Patent: Apr. 23, 2019

(54) LIGHT APPARATUS FOR PRODUCING PSEUDO SURROUNDINGS ENVIRONMENT

(71) Applicant: Panasonic Intellectual Property Management Co., Ltd., Osaka (JP)

(72) Inventors: Kentaro Yamauchi, Hyogo (JP); Hironori Takeshita, Osaka (JP); Satoshi Hyodo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/936,022

(22) Filed: Mar. 26, 2018

(65) Prior Publication Data
US 2018/0283655 A1 Oct. 4, 2018

(30) Foreign Application Priority Data
Mar. 29, 2017 (JP) ................. 2017-065539

(51) Int. Cl.
*F21V 9/40* (2018.01)
*F21V 23/00* (2015.01)
*F21V 13/02* (2006.01)
*F21S 8/04* (2006.01)

(52) U.S. Cl.
CPC ............... *F21V 9/40* (2018.02); *F21S 8/04* (2013.01); *F21V 13/02* (2013.01); *F21V 23/003* (2013.01)

(58) Field of Classification Search
CPC .......... F21V 9/40; F21V 13/02; F21V 23/003; F21S 8/04
See application file for complete search history.

(56) References Cited

U.S. PATENT DOCUMENTS

| 2014/0133125 A1 | 5/2014 | Di Trapani et al. |
| 2014/0254155 A1 | 9/2014 | Higashi et al. |
| 2016/0281960 A1 | 9/2016 | Di Trapani et al. |
| 2017/0051893 A1 | 2/2017 | Di Trapani |

FOREIGN PATENT DOCUMENTS

| JP | 2012-064474 A | 3/2012 |
| JP | 2012-234729 A | 11/2012 |
| JP | 2014-175226 A | 9/2014 |
| JP | 2015-207554 A | 11/2015 |
| JP | 2016-514340 A | 5/2016 |

*Primary Examiner* — Joseph L Williams
(74) *Attorney, Agent, or Firm* — McDermott Will & Emery LLP

(57) ABSTRACT

A lighting apparatus includes: a case having an opening portion; a light emission panel in the case, the light emission panel having a light emission surface which emits light having a light distribution which dynamically changes; and a light distribution modification panel in the opening portion and having a distribution-modified light emission surface which modifies the light distribution of the light to emit light having a modified light distribution. The light emission panel emits, as the light having the light distribution, light having at least one of a luminance distribution and a chromaticity distribution of a first image to be presented on the light emission surface. The light distribution modification panel diffuses and transmits the light emitted from the light emission surface to emit light such that the at least one distribution of a second image to be presented on the distribution-modified light emission surface is changed to a blurred state.

13 Claims, 14 Drawing Sheets

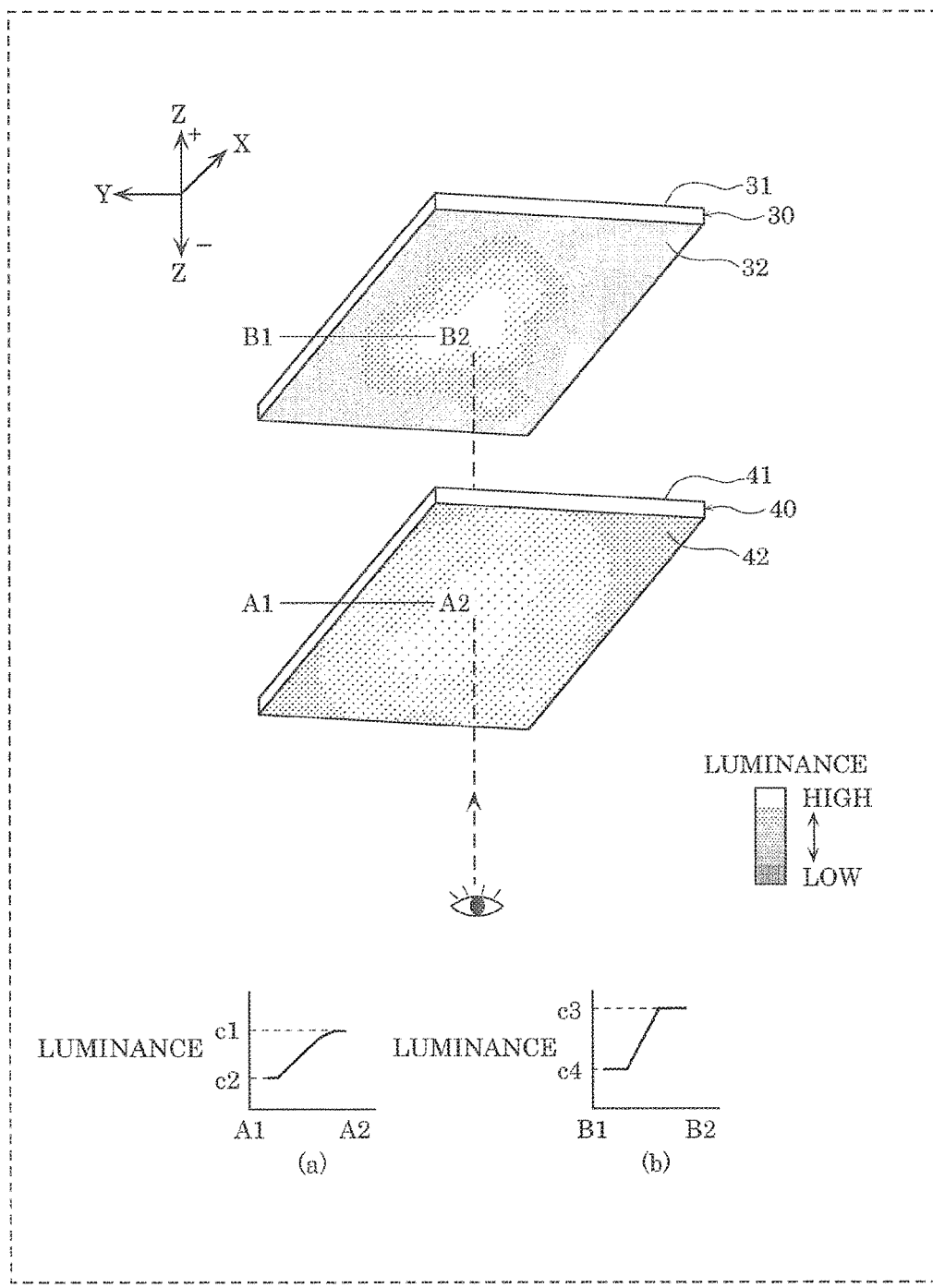

LIGHT APPARATUS FOR PRODUCING PSEUDO SURROUNDINGS ENVIRONMENT

CROSS REFERENCE TO RELATED APPLICATION

This application claims the benefit of priority of Japanese Patent Application Number 2017-065539 filed on Mar. 29, 2017, the entire content of which is hereby incorporated by reference.

BACKGROUND

1. Technical Field

The present disclosure relates to a lighting apparatus for producing a pseudo surrounding environment such as a blue sky.

2. Description of the Related Art

Outdoor light does not enter places such as a window-less meeting room, an underground town, and a tunnel. In such a building, a person may have a sense of being pressured or stressed.

In view of this, lighting apparatuses have been proposed (for example, see Japanese Unexamined Patent Application Publication No. 2016-514340).

Such a lighting apparatus includes a pseudo window disposed on one of a ceiling and a wall of such a building and produces pseudo surrounding environment such as a blue sky, thereby providing a person with a sense of being released and reducing such a sense of being pressured or stressed.

SUMMARY

The conventional lighting apparatus is, for example, configured to include: a light diffuser disposed in an opening portion surrounded by a frame body provided on a ceiling surface; and a light source disposed above the light diffuser (disposed at a position toward the ceiling) with respect to the light diffuser. However, it is difficult for the lighting apparatus, when configured to include the light source disposed closer to the light diffuser, to produce a surrounding environment which provides a sense of depth because the light source appears to be close. The lighting apparatus when configured to include the light source disposed far apart from the light diffuser inevitably has large dimensions.

In view of this, the present disclosure has an object to provide a lighting apparatus for producing a pseudo surrounding environment while having reduced dimensions.

In order to achieve the above object, a lighting apparatus according to an aspect of the present disclosure includes: a case having an opening portion; a light emission panel provided in the case, the light emission panel having a light emission surface which emits light having a light distribution which dynamically changes; and a light distribution modification panel provided in the opening portion to be located opposite the light emission panel, the light distribution modification panel having a distribution-modified light emission surface which modifies the light distribution of the light emitted from the light emission surface to emit light having a modified light distribution; wherein the light emission panel emits, as the light having the light distribution, light having at least one of a luminance distribution and a chromaticity distribution of a first image to be presented on the light emission surface, and the light distribution modification panel diffuses and transmits the light emitted from the light emission surface to emit light such that the at least one of the luminance distribution and the chromaticity distribution of a second image to be presented on the distribution-modified light emission surface is changed to a blurred state.

The present disclosure makes it possible to provide the lighting apparatus for producing a pseudo surrounding environment while having reduced dimensions.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7A is a diagram illustrating an example of a luminance distribution of an image presented by the lighting apparatus according to Embodiment 1;

DETAILED DESCRIPTION OF THE EMBODIMENTS

Underlying Knowledge Forming Basis of the Present Disclosure

For example, when a person sees a blue sky from the inside of a building through a window, the person has a sense of infinite depth over the window. For this reason, when producing a pseudo environment similar to a natural environment such as a blue sky using a lighting apparatus, there is a demand for providing a sense of depth closer to a natural depth. Here, descriptions are given of some conditions for providing a target to be produced (such as a blue sky, clouds, a rising sun, a cloudy sky, an evening sky, a falling sun, an airplane) by the lighting apparatus with a depth similar to a natural depth.

Figure 1A:
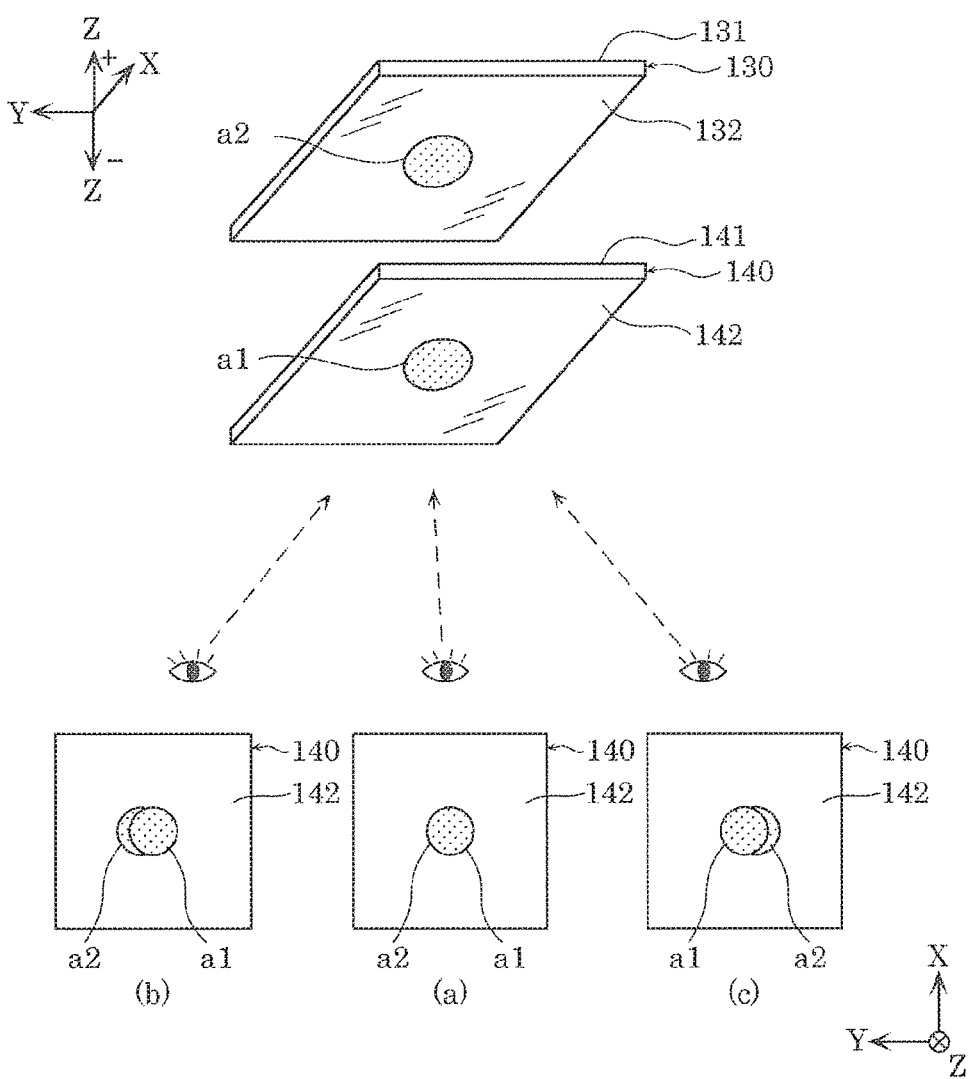
FIG. 1A is a diagram illustrating an example of an image presented on a lighting apparatus.

FIG. 1A is a diagram illustrating an example of an image presented on a lighting apparatus.

The lighting apparatus illustrated in FIG. 1A includes two color presentation panels 130 and 140. Color presentation panel 130 is, for example, a panel which either (i) emits light by way of self-emission, (ii) transmits light emitted by a light source to emit the light, or (iii) reflects light emitted by a light source to emit the light, thereby presenting an image having a color on itself. Color representation panel 140 is a panel which transmits light emitted from color presentation panel 130 to emit the light, thereby presenting an image having a color on itself. Color presentation panels 130 and 140 are located opposite with a gap.

Hereinafter, descriptions are given of examples of diffuse transmitting plates which diffuse and transmit light emitted from a light source to emit the light, thereby presenting an image having a color on itself. For example, a light source (not illustrated) which emits light toward color presentation plate 130 is disposed at the positive side of Z axis of color presentation plate 130. The light emitted from the light source enters on incident surface 131 of color presentation plate 130, passes through color presentation plate 130, and is emitted from emission surface 132. Color presentation plate 130 presents image a2 as the light emitted from the light source. The light emitted from emission surface 132 of color presentation panel 130 enters incident surface 141 of color presentation panel 140, passes through color presentation panel 140, and is emitted from emission surface 142. Color presentation panel 140 presents image a1 having a shape and a color similar to those of image a2 as light emitted from emission surface 142. A user who views the lighting apparatus is at the negative side of Z axis of color presentation panel 140. The user views images a1 and a2 presented on color presentation panels 140 and 130, respectively, of the lighting apparatus.

In FIG. 1A, (a) is a front view of the two color presentation panels 130 and 140, which shows a state where image a1 presented on color presentation panel 140 located at a near side and image a2 presented on color presentation panel 130 located at a depth side are seen in an overlapped manner. In FIG. 1A, (b) is a left perspective view of the two color presentation panels 130 and 140, which shows a state where image a1 at the near side is shifted rightward (in the negative side of Y direction) with respect to image a2 at the depth side. In FIG. 1A, (c) is a right perspective view of the two color presentation panels 130 and 140, which shows a state where image a1 at the near side is shifted leftward (in the positive side of Y direction) with respect to image a2 at the depth side.

It is possible to provide the user with a sense of depth due to a motion parallax by adjusting the relational positions of images a1 and a2 presented respectively on color presentation panels 140 and 130. In other words, it is possible to provide the target to be presented with a depth by arranging these two images a1 and a2 apart from each other in the depth direction (Z direction).

Figure 1B:
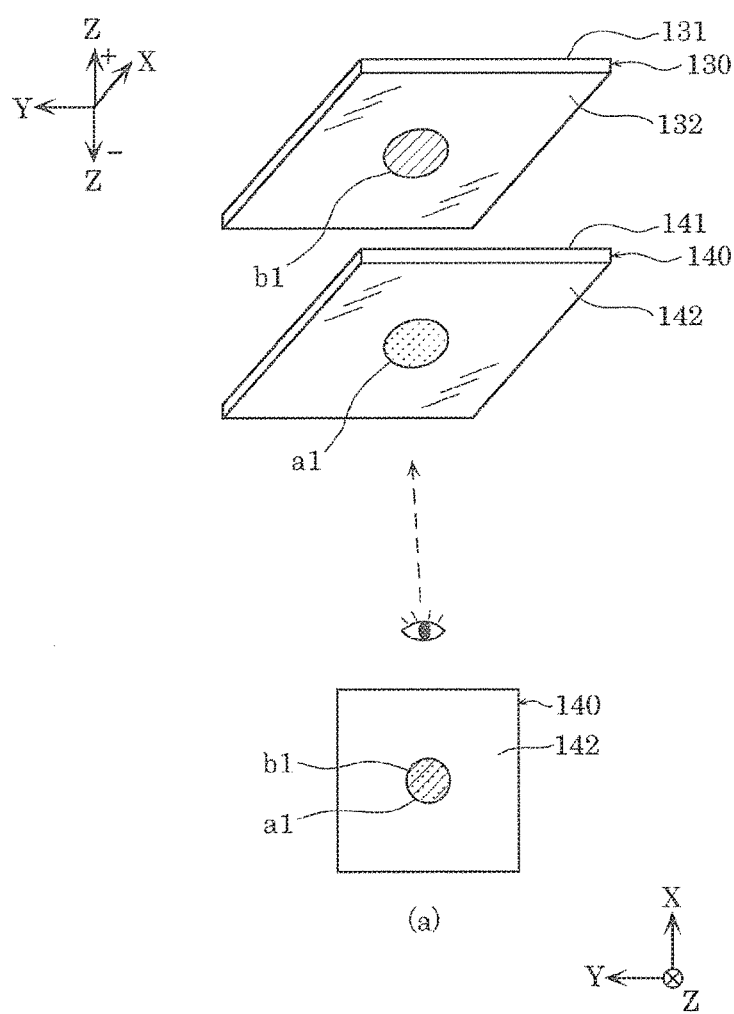
FIG. 1B is a diagram illustrating a comparative example of an image presented by a lighting apparatus.

FIG. 1B is a diagram illustrating a comparative example of an image presented on a lighting apparatus.

This comparative example shows a state where the images presented on color presentation plates 130 and 140 are the same in shape but different in color. More specifically, image a1 is presented on color presentation panel 140, and image b1 having a color different from the color of image a1 is presented on color presentation panel 130. In FIG. 1B, (a) is a front view of the two color presentation panels 130 and 140, which shows a state where image a1 presented on color presentation panel 140 located at a near side and image a2 presented on color presentation panel 130 located at a depth side are seen in an overlapped manner.

When images b1 and a1 having different colors are presented respectively on color presentation panels 130 and 140 as in the comparative example illustrated in (a) of FIG. 1B, a user viewing the lighting apparatus can easily recognize the distance between image a1 located at the near side and image b1 located at the depth side. For this reason, although a depth is obtained in the comparative case, the depth is limited within a range of the actual distance between color presentation panel 130 and color presentation panel 140. In the case of (a) of FIG. 1A, it is visually difficult for a user viewing the lighting apparatus to recognize the position of image a1 and the position of image a2 in the depth direction when images a2 and a1 having similar colors are presented respectively on color presentation panels 130 and 140. For this reason, it is possible to cause the user viewing the lighting apparatus to loosely focus his or her eyes at a position farther than image a2, thereby causing the user to feel as if the target to be produced were present at a distant place. In other words, it is possible to cause the user to feel as if the target to be produced were present at the distant place in the depth direction by presenting the two images a1 and a2 using similar colors.

It is to be noted that similar colors referred to here are colors which look like a same color to human eyes. For example, similar colors are colors whose chrominance ΔE is 25 or less. For example, a similar color is either one of red, yellow red, yellow, yellow green, green, blue green, blue, purple blue, purple, and red purple which are basic chromatic colors defined in JIS E 8102, or one of white, gray, and black which are basic non-chromatic colors defined in JIS E 8102.

Although FIG. 1A illustrates the contours of image a1 and image a2 to facilitate understanding, it is to be noted that the contours of image a1 and image a2 are illustrated in a blurred manner when a diffuse transmitting panel is used as color presentation plate 140. For this reason, it is possible to cause the user to focus more loosely, thereby causing the user to feel as if the target to be produced were present at a still farther place. In other words, it is possible to cause the user to feel as if the target to be produced were present at a still farther place by using the diffuse transmitting panel as at least color presentation panel 140 located at the depth side.

When the some conditions stated above are satisfied, the lighting apparatus having reduced dimensions can produce a pseudo surrounding environment having a depth.

Hereinafter, a lighting apparatus according to embodiments of the present disclosure is described with reference to the drawings. Each of the embodiments described below indicates a specific example of the present disclosure. Accordingly, the numerical values, shapes, materials, constituent elements, the arrangement and connection of the constituent elements, indicated in the following exemplary embodiments are mere examples, and therefore do not limit the scope of the present disclosure. Therefore, among the constituent elements in the following exemplary embodiments, constituent elements not recited in any one of the independent claims which defines the most generic concept of the present disclosure are described as arbitrary constituent elements.

In addition, the phrase "approximately . . . " is used, in an exemplary case of "an approximately rectangular one", to include not only "a fully rectangular one" but also "a substantially rectangular one".

Each of the drawings is a schematic diagram, and thus is not always illustrated precisely. In addition, in each diagram, substantially the same constituent elements may be assigned with the same reference numerals, and overlapping descriptions are omitted or simplified.

In addition, in the drawings used to illustrate the embodiment below, coordinate axes may be indicated. The negative side of Z axis shows the floor side, and the positive side of Z axis shows the ceiling side. Here, the X-axis direction and the Y-axis direction are orthogonal to each other on a plane perpendicular to the Z-axis direction. The X-Y plane is a plane parallel to light distribution modification plates of the lighting apparatus. For example, in the embodiments below, a "plan-view shape" is a shape when seen in the Z-axis direction.

Embodiment 1

[1-1. Configuration of Lighting Apparatus]

First, a configuration of lighting apparatus 1 according to Embodiment 1 is described.

Figure 2:
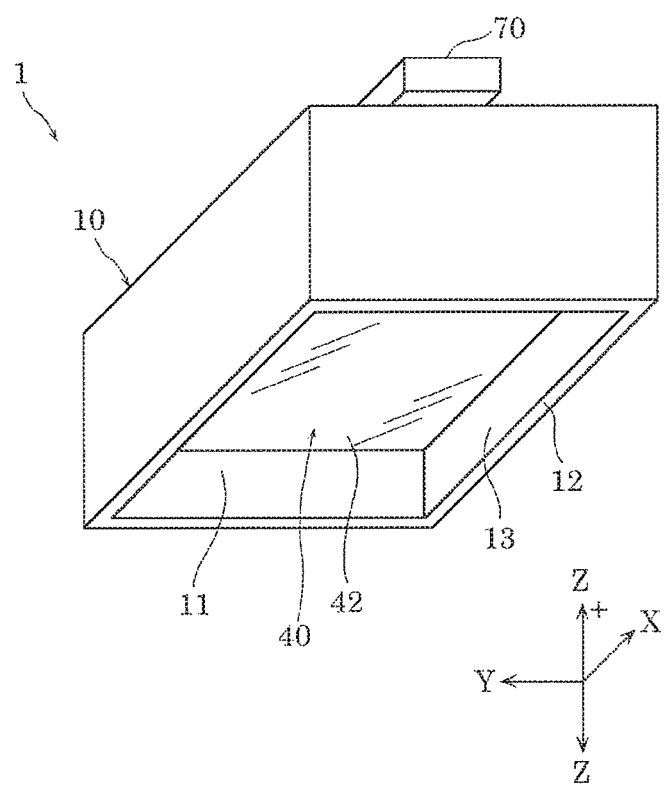
FIG. 2 is a schematic perspective view of an appearance of a lighting apparatus according to Embodiment 1.
Figure 3:
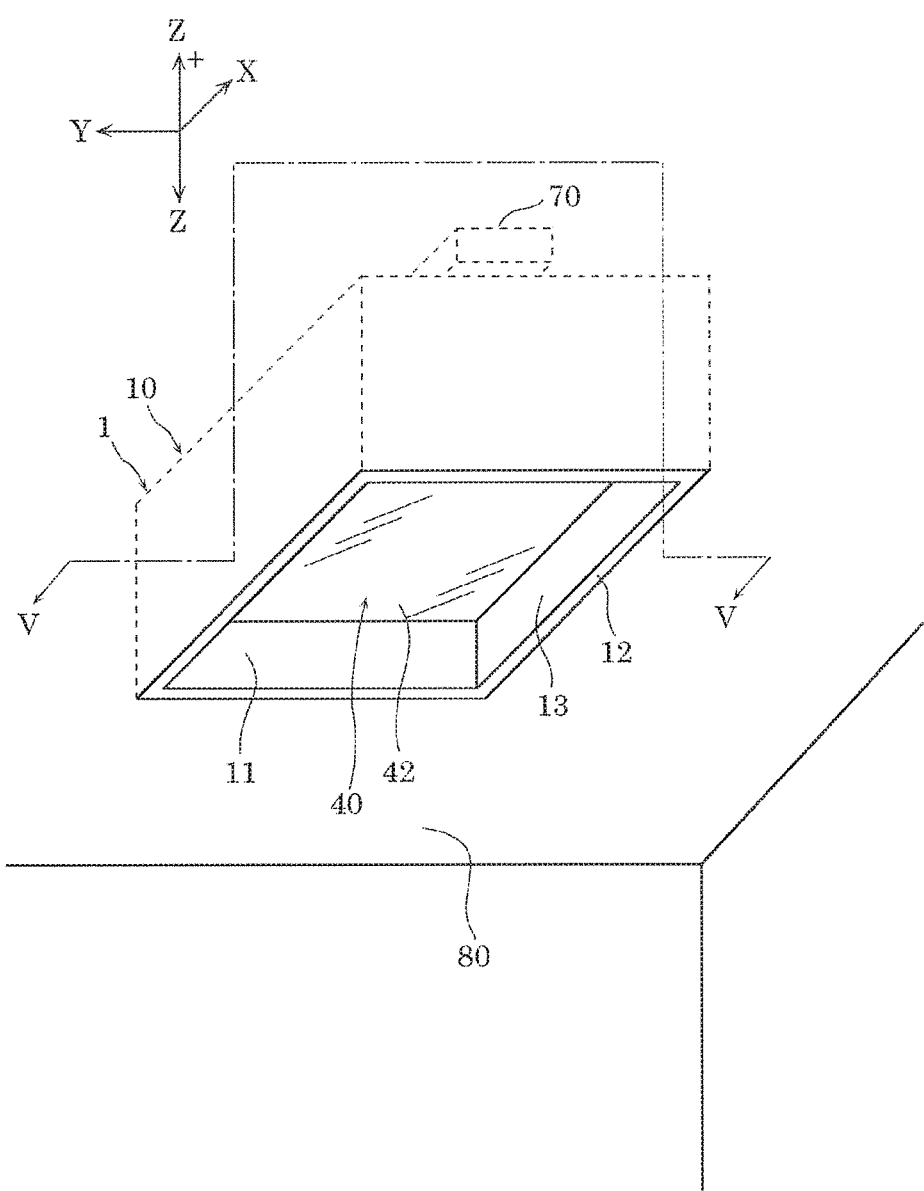
FIG. 3 is a diagram illustrating a state in which the lighting apparatus according to Embodiment 1 is disposed on a ceiling.
Figure 4:
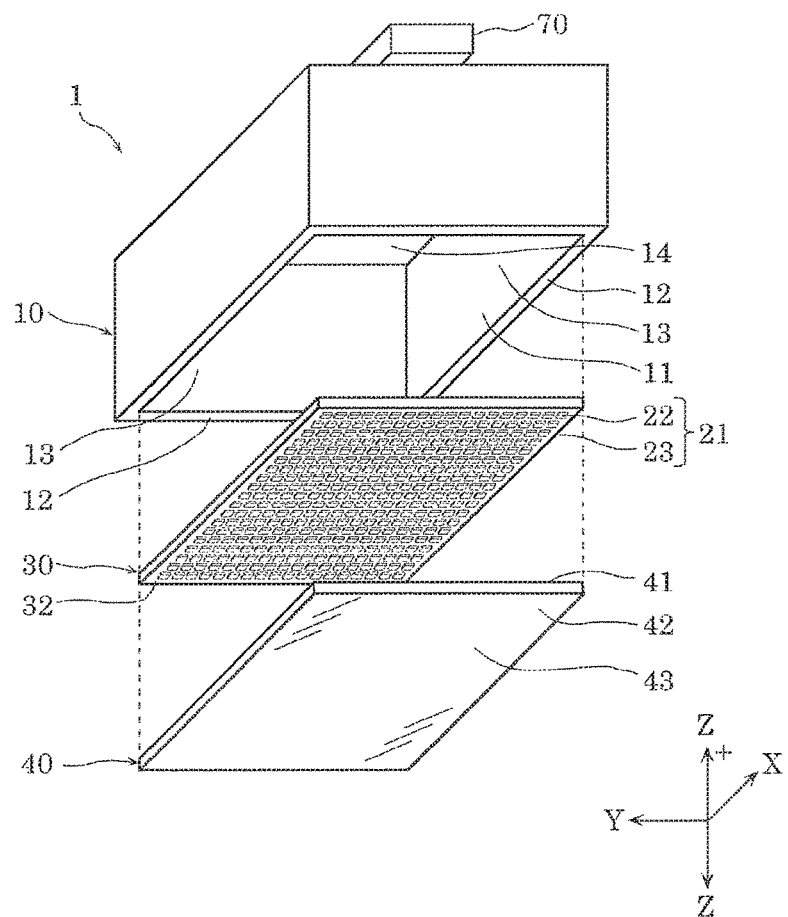
FIG. 4 is an exploded perspective view of the lighting apparatus according to Embodiment 1.
Figure 5:
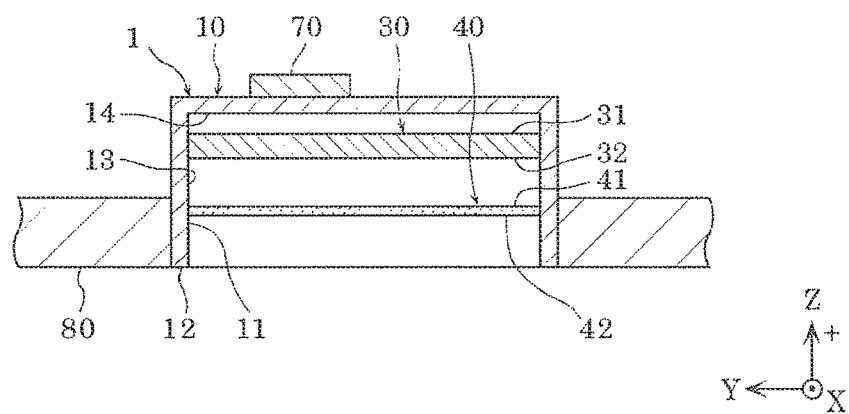
FIG. 5 is a cross sectional view of the lighting apparatus in FIG. 3 when the lighting apparatus is cut along line V-V in FIG. 3.

FIG. 2 is a schematic perspective view of an appearance of lighting apparatus 1. FIG. 3 is a perspective view of a state in which lighting apparatus 1 is disposed on ceiling 80. FIG. 4 is an exploded perspective view of lighting apparatus 1. FIG. 5 is a cross sectional view of lighting apparatus 1 in FIG. 3 when lighting apparatus 1 is cut along line V-V in FIG. 3.

Lighting apparatus 1 is an apparatus for causing a user who uses lighting apparatus 1 to experience a virtual reality of a sense of looking outside from inside of a building through a window. Lighting apparatus 1 is disposed on ceiling 80 which is an example of a building component as illustrated in FIG. 3 for example.

As illustrated in FIGS. 2 to 5, lighting apparatus 1 includes: case 10; light emission panel 30; light distribution modification plate 40; and controller 70. Correspondence to FIG. 1A described earlier is as follows: light emission panel 30 corresponds to color presentation panel 130 which emits light; and light distribution modification panel 40 corresponds to color presentation panel 140. It is to be noted that "emission" according to the present disclosure means at least one of emission by way of self-emission, emission by way of transmission, and emission by way of reflection. For example, "to emit" means at least one of to emit light by way of self-emission, to transmit light emitted by a light source so as to emit the transmitted light, and to reflect light emitted by a light source so as to emit the reflected light.

Case 10 is cuboid-shaped, and has an approximately rectangular in a plan view. Light emission panel 30 and light distribution modification panel 40 are housed in case 10. Case 10 has opening portion 11 which is rectangular at the floor side (negative side of Z axis). Light distribution modification panel 40 is disposed in opening portion 11 of case 10. Light emission panel 30 is disposed between bottom surface 14 of case 10 and light distribution modification panel 40. Light emission panel 30 and light distribution modification panel 40 are located opposite with a gap. Controller 70 is disposed outside case 10. It is to be noted that controller 70 may be housed in case 10.

Case 10 is made of, for example, one of a metal, and a non-metal material having a high thermal conductivity. Non-metal materials having a high thermal conductivity includes, for example, resin having a high thermal conductivity. The shape of case 10 is not limited to such an approximately rectangular shape, and is may be an approximately circular shape, an approximately polygonal shape, an approximately semi-circular shape, or the like.

Light emission panel 30 is configured with light emitting module 21 having board 23 and a plurality of light emitting elements 22 mounted on board 23. Light emission panel 30 provides, for example, a video of a blue sky and flowing clouds by means of the plurality of light emitting elements 22 being under light emission control of controller 70.

In other words, light emission panel 30 emits dynamically changing light of such a video or the like under light emission control of controller 70. Light emission panel 30 includes light emission surface 32 which emits the dynamically changing light. The light emitted from light emission surface 32 is not plain light having an even distribution but light having a luminance distribution, a chromaticity distribution, or the like. It is to be noted that dynamic light may be emitted by light emission plate 30 which is an organic EL used as light emission panel 30.

Board 23 is a printed wiring board for mounting a plurality of light emitting elements 22, and is formed to be approximately rectangular. As board 23, for example, a resin board mainly made of a resin, a metal board mainly made of a metal, and ceramic board made of ceramic, or the like can be used.

Light emitting element 22 is configured with a light emitting diode (LED). The plurality of light emitting elements 22 are arranged in a matrix at equal intervals on board 23. Each light emitting element 22 is disposed on a principal surface located opposite light distribution modification panel 40 out of the both principal surfaces of board 23. In other words, light emission panel 30 is disposed such that light emission surface 32 is located opposite light distribution modification panel 40.

Light emitting element 22 is an LED element of an RGB type which emits light of three primary colors which are blue light, green light, and red light. Since light emitting elements 22 are RGB-type LED elements, it is possible to cause them to emit various color light by controlling the blue light, green light, and red light. Light emitting elements 22 may be one of LED elements of a surface mount device (SMD) type and LED elements of a chip on board (COB) type. Light emitting elements 22 may be of one of an RGB three color type, an RGBW four color type, and a BW (blue and white) two color type.

Light distribution modification panel 40 is a diffuse transmitting panel which transmits and diffuses light emitted from light emission panel 30 to emit the light toward the floor side. Light distribution modification panel 40 has a distribution-modified light emission surface 42 which modifies the light distribution of light emitted from light emission panel 30 to emit the light having the modified light distribution. The light distribution is, for example, one of a luminance distribution and a chromaticity distribution.

Light distribution modification panel 40 is made by, for example, performing diffusion processing to a translucent panel made of one of a resin material and glass. The resin material is, for example, acryl, polyethylene terephthalate, or the like. The diffusion processing is performed on at least one of incident surface 41 and distribution-modified light emission surface 42 of light distribution modification panel 40. Examples of diffusion processing include a prism forming process for forming a prism having fine dot-shaped holes (recessed portions). In addition, diffusion processing is not limited to the prism forming process, and may be one of emboss processing and printing. In addition, diffusion processing may be performed by diffusing a diffusing agent such as silicon oxide ($SiO_2$) particles onto one of a resin material and glass.

A haze value of light distribution modification panel 40 which has been subjected to the diffusion processing is, for example, in a range from 10% to 90%. By configuring light distribution modification panel 40 made of a translucent material to have a haze value of 10% or more, it is possible to prevent light emitting elements 22 of light emission panel 30 from looking like grains to a user. By configuring light distribution modification panel 40 made of a translucent material to have a haze value of 90% or less, it is possible to secure, to a certain degree, the contours (such as contours of clouds in a blue sky) of a video presented on light distribution modification panel 40. It is to be noted that the haze value is adjustable according to the shape and the size of a prism formed in a prism forming process.

As illustrated in FIG. 5, light distribution modification panel 40 is provided in opening portion 11 of case 10 by making the periphery of light distribution modification panel 40 in contact with inside surfaces 13 of case 10. It is to be noted that light distribution modification panel 40 is positioned closer to bottom surface 14 than to edge surface 12 of opening portion 11 of case 10. For example, when lighting apparatus 1 is installed on ceiling 80, light distribution modification panel 40 is disposed to be located outside the surface of ceiling 80 (see FIG. 3).

Light distribution modification panel 40 receives, through incident surface 41, light emitted from light emission surface 32 of light emission panel 30 and transmits and diffuses the incident light to emit the light. On light distribution modification panel 40, light having a color similar to the color of light emitted by light emitting module 21 of light emission panel 30 is presented. At this time, light distribution modification panel 40 diffuses and transmits the light emitted from light emission surface 32 to emit light such that one of the luminance distribution and the chromaticity distribution of the second image to be presented on the distribution-modified light emission surface is changed to a blurred state.

Figure 6:
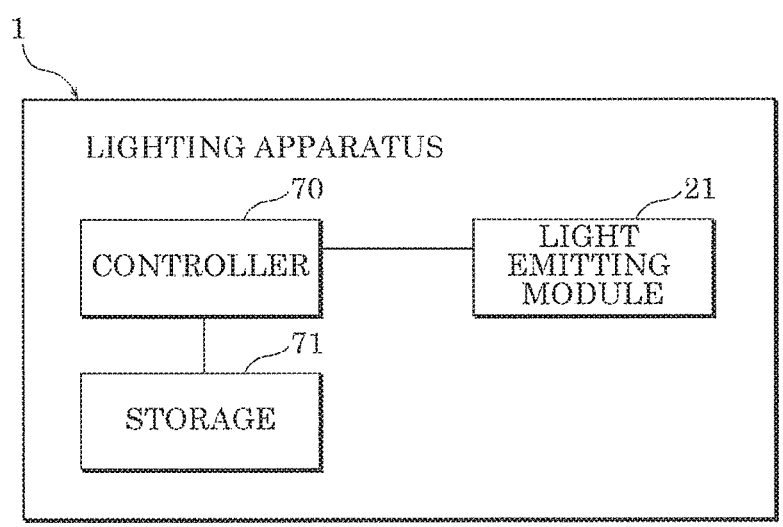
FIG. 6 is a block diagram of a control configuration of the lighting apparatus according to Embodiment 1.

FIG. 6 is a block diagram of a control configuration of lighting apparatus 1. Focusing on the control configuration of lighting apparatus 1, lighting apparatus 1 includes: controller 70; and storage 71 and light emitting module 21 which are connected to controller 70.

Controller 70 controls operations such as turn-on, turn-off, dimming, and toning (adjustment of one of an emission color and a color temperature) of light emitting module 21. Controller 70 is implemented as one of a micro-computer, a processor or the like, and an exclusive circuit.

Controller 70 obtains information related to an image stored in storage 71 and controls light emission of light emitting module 21 according to the information. For example, when a blue sky is presented on light distribution modification panel 40, controller 70 obtains information related to the blue sky from storage 71, and controls light emission of a plurality of light emitting elements 22 based on the obtained information. By causing controller 70 to control light emission of each light emitting element 22 in this way, lighting apparatus 1 presents, on light distribution modification panel 40, an image of a blue sky, clouds, a cloudy sky, a rising sun, an evening sky, a falling sun, or the like.

Here, descriptions are given of a luminance distribution and a chromaticity distribution of an image presented by lighting apparatus 1.

FIG. 7A is a diagram illustrating an example of a luminance distribution of an image presented by lighting apparatus 1. FIG. 7A illustrates a luminance distribution of a first image presented on light emission surface 32 of light emission panel 30 and a luminance distribution of a second image presented on distribution-modified light emission surface 42 of light distribution modification panel 40.

As illustrated in FIG. 7A, the luminance difference (the difference between a largest value and a smallest value of luminance) in the luminance 5 distribution of the second image to be presented on distribution-modified light emission surface 42 is smaller than the luminance difference (the difference between a largest value and a smallest value of luminance) in the luminance distribution of the first image to be presented on light emission surface 32. In other words, light emitted from incident surface 41 is transmitted and diffused by light distribution modification panel 40, which modifies the luminance distribution of the first image to be presented on light emission surface 32 such that the luminance distribution of the second image to be presented on distribution-modified light emission surface 42 has a smaller variation in distribution.

In FIG. 7A, (a) illustrates luminance change focusing on line A1-A2 of distribution-modified light emission surface 42. As illustrated in (a) of FIG. 7A, the luminance on distribution-modified light emission surface 42 is on a gradual increase from coordinates A1 to coordinates A2. In FIG. 7A, (b) illustrates luminance change focusing on line B1-B2 of light emission surface 32. As illustrated in (b) of FIG. 7A, the luminance on light emission surface 32 increases in a portion sharply than the luminance along line A1-A2. The portion is included in a range from coordinates B1 to coordinates B2. As illustrated in (a) and (b) of FIG. 7A, the difference between largest luminance value $c1$ and smallest luminance value $c2$ of a second image presented on distribution-modified light emission surface 42 is smaller than the difference between largest luminance value $c3$ and smallest luminance value $c4$ of a first image presented on light emission surface 32.

In this embodiment, the luminance distribution of the first image presented on light emission panel 30 located farther from the user is changed to a blurred state, and the blurred luminance distribution is presented on light distribution modification panel 40 located closer to the user in this way. In this way, it is possible to obscure the difference between an emission position of light to be emitted from light emission panel 30 and an emission position of light to be emitted from light distribution modification panel 40. Thus, it is possible to cause the user to feel as if the target to be presented by lighting apparatus 1 were present far away.

Here, a description is given of a mechanism of causing the user to feel as if the target to be produced were present far away. Examples of factors which cause the user to feel as if the target to be produced were present far away include physiological factors and a psychological factor.

First, three factors are listed below as physiological factors.

The first physiological factor is that both of light emission surface 32 and distribution-modified light emission surface 42 look blurred to the user, that the user has difficulty in exerting a distance perception function by focusing. The second physiological factor is that there are two images whose locations are difficult to be identified by the user. More specifically, the second physiological factor is that there are two images (the first image presented on light emission surface 32 and the second image presented on distribution-modified light emission surface 42) whose distances from the user are difficult to be identified by the user, and these two image looks in an overlapped manner to the user. Third factor is that the user feels as if the second image were present at a place farther than distribution-modified light emission surface 42 due to a motion parallax illustrated in FIG. 1A.

Due to these three factors, the user has difficulty in identifying the position of the second image presented on distribution-modified light emission surface 42, and feels as if the second image were present at the place farther than distribution-modified light emission surface 42.

Next, the psychological factor is described taking an example where the image is an image of a natural object such as a blue sky and clouds. The psychological factor in this case is that, when the user looks the image of the blue sky and clouds, the user reminds experiences in which he or she looked a real blue sky and real clouds and feels as if the first image on light emission surface 32 and the second image on distribution-modified light emission surface 42 were far away due to a psychological bias in thought that a blue sky and clouds look infinite.

Lighting apparatus 1 is capable of causing a user to feel as if a target to be produced were present far away by providing a user with such physiological factors and psychological factor.

Figure 7B:
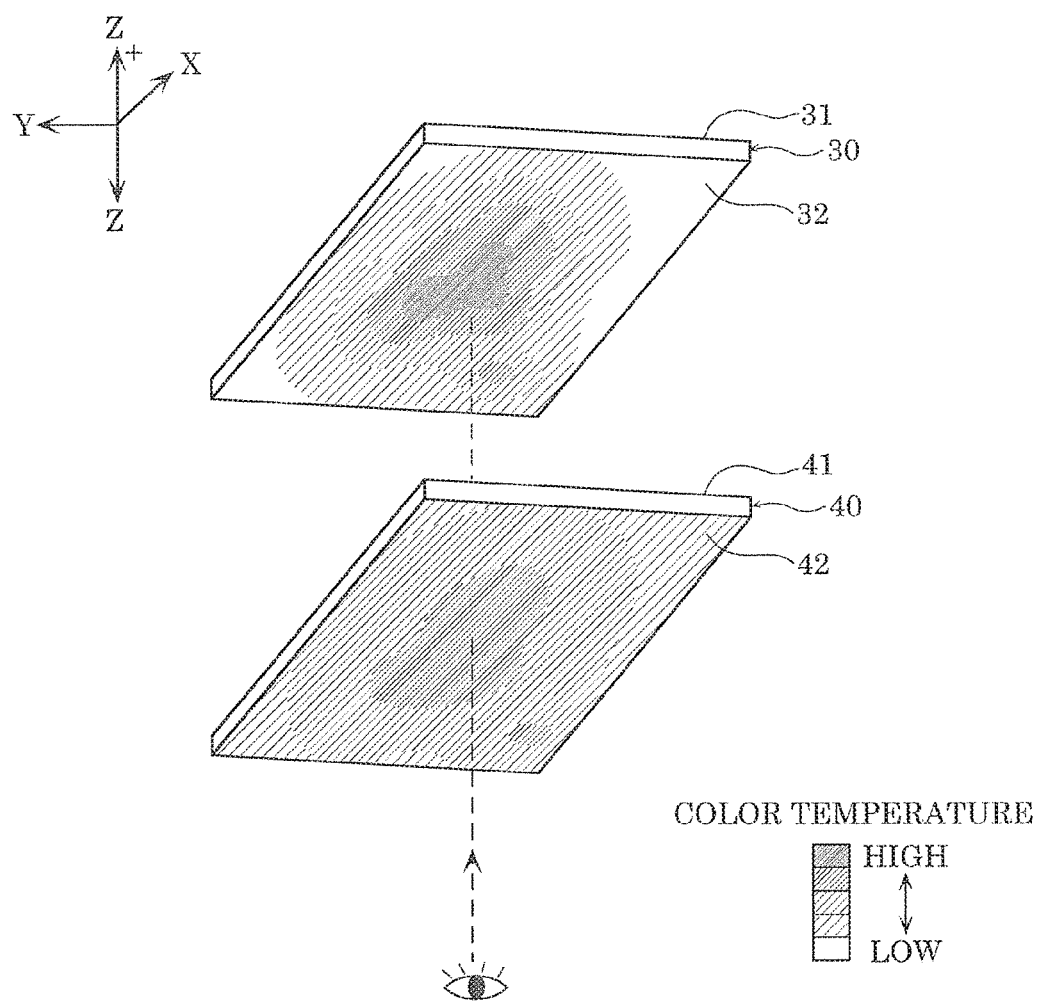
FIG. 7B is a diagram illustrating an example of a chromaticity distribution of an image presented by the lighting apparatus according to Embodiment 1.

FIG. 7B is a diagram illustrating an example of a chromaticity distribution of an image presented by lighting apparatus 1.

FIG. 7B illustrates a chromaticity distribution of a first image presented on light emission surface 32 of light emission panel 30 and a chromaticity distribution of a second image presented on distribution-modified light emission surface 42 of light emission panel 40.

As illustrated in FIG. 7B, the chrominance of the second image presented on distribution-modified light emission surface 42 is smaller than the chrominance of the first image presented on light emission surface 32. In other words, light emitted from light emission surface 32 is transmitted and diffused by light distribution modification panel 40, which modifies the chromaticity distribution of the first image presented on light emission surface 32 such that the chromaticity distribution of the second image to be presented on distribution-modified light emission surface 42 has a smaller variation in distribution.

In this way, the chromaticity distribution of the first image presented on light emission panel 30 located farther from the user is changed to a blurred state, and the blurred luminance distribution is presented on light distribution modification panel 40 located closer to the user. In this way, it is possible to obscure the difference between an emission position of light to be emitted from light emission panel 30 and an emission position of light to be emitted from light distribution modification panel 40. Lighting apparatus 1 is capable of causing a user to feel as if a target to be produced were present far away by providing the user with such physiological factors and psychological factor as described above.

[1-2. Effects Etc.]

Lighting apparatus 1 according to this embodiment includes: case 10 having opening portion 11; light emission panel 30 which is provided in case 10 and has light emission surface 32 which emits light having a light distribution which dynamically changes; and light distribution modification panel 40 which is provided in opening portion 11 to be located opposite light emission panel 30 and has distribution-modified light emission surface 42 which modifies the light distribution of the light emitted from light emission surface 32 to emit light having a modified light distribution.

Light emission panel 30 emits, as the light having the light distribution, light having at least one of a luminance distribution and a chromaticity distribution of a first image to be presented on light emission surface 32. Light distribution modification panel 40 diffuses and transmits the light emitted from light emission surface 32 to emit light such that the at least one of the luminance distribution and the chromaticity distribution of a second image to be presented on distribution-modified light emission surface 42 is changed to a blurred state.

In this way, light emission panel 30 and light distribution modification panel 40 are arranged to be opposite, which makes it possible to provide a depth to the target to be produced by the light having the luminance distribution on light emission surface 32 and the light having the luminance distribution on distribution-modified light emission surface 42. The luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to allow the user to feel as if the target to be produced were present far away due to the physiological factors and the psychological factor, thereby producing a deep depth.

In this way, light emission panel 30 and light distribution modification panel 40 are arranged to be opposite, which makes it possible to provide a depth to the target to be produced by the light having the chromaticity distribution on light emission surface 32 and the light having the chromaticity distribution on distribution-modified light emission surface 42. The chromaticity distribution of the first image presented on light emission surface 32 is changed to a blurred state and the blurred chromaticity distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to allow the user to feel as if the target to be produced were present far away due to the physiological factors and the psychological factor, thereby producing a deep depth.

Lighting apparatus 1 according to Embodiment 1 is capable of producing a surrounding environment with the deep depth while being configured to have reduced dimensions without the need that light emission panel 30 and light distribution modification panel 40 are arranged widely apart from each other.

For example, light emission panel 30 emits the light having the luminance distribution out of the luminance distribution and the chromaticity distribution of the first image to be presented on light emission surface 32. For example, light distribution modification panel 40 emits the light such that the luminance distribution of the second image to be presented on the distribution-modified light emission surface is changed to the blurred state. The difference between a largest value and a smallest value of luminance of the second image to be presented on distribution-modified light emission surface 42 may be smaller than the difference between a largest value and a smallest value of luminance of the first image to be presented on light emission surface 32.

In this case, it is possible to obscure the difference between the emission position recognized based on the luminance of light to be emitted from light emission panel 32 and the emission position recognized based on the luminance of light to be emitted from distribution-modified light emission surface 42. In this way, it is possible to allow the user to feel as if the target to be produced were present far away due to the physiological factors and the psychological factor, thereby producing a deep depth.

For example, light emission panel 30 emits the light having the chromaticity distribution out of the luminance distribution and the chromaticity distribution of the first image to be presented on light emission surface 32. For example, light distribution modification panel 40 emits the light such that the chromaticity distribution of the second image to be presented on distribution-modified light emission surface 42 is changed to the blurred state. The difference in chrominance of the second image to be presented on the distribution-modified light emission surface may be smaller than the difference in chrominance of the first image to be presented on light emission surface 32.

In this case, it is possible to obscure the difference between the emission position recognized based on the chromaticity of light to be emitted from light emission panel 32 and the emission position recognized based on the chromaticity of light to be emitted from distribution-modified light emission surface 42. In this way, it is possible to allow the user to feel as if the target to be produced were present far away due to the physiological factors and the psychological factor, thereby producing a deep depth.

For example, the light emitted from distribution-modified light emission surface 42 may have a color similar to the color of the light emitted from the light emission surface.

In this way, it is difficult for the user to visually recognize the emission position of the light emitted from light emission surface 32 and the emission position of the light emitted from distribution-modified light emission surface 42. In this way, the user focuses at a place farther than light emission surface 32, which makes it possible to cause the user to feel as if the target to be produced were present far away, thereby producing a deep depth.

For example, when blue light is presented on light emission surface 32 and distribution-modified light emission surface 42, light emission surface 32 on which blue light is presented is present at the back surface side of distribution-modified light emission surface 42 on which the same blue light is presented. Thus, it is possible to produce a surrounding environment having a deep depth where blue light is continuous.

For example, light emission panel 30 includes a plurality of light emitting elements 22. For example, lighting apparatus 1 further includes controller 70 which controls light emission of the plurality of light emitting elements 22. Controller 70 may control the light emission of the plurality of light emitting elements 22 so as to adjust the at least one of the luminance distribution and the chromaticity distribution of the first image to be presented on light emission surface 32.

In this way, it is possible to adjust one of the luminance distribution and the chromaticity distribution on light emission surface 32, and thus to efficiently emit light having a dynamically changing light distribution. In addition, it is also possible to produce a surrounding environment using few constituent elements which are light emission panel 30 and light distribution modification panel 40, for example without using any other diffusion transmitting panel. For this reason, it is possible to reduce the distance in the direction in which light emission panel 30 and light distribution modification panel 40 are located opposite, thereby providing lighting apparatus 1 having reduced dimensions.

Embodiment 2

Next, a configuration of lighting apparatus 1A according to Embodiment 2 is described. Lighting apparatus 1A differs from lighting apparatus 1 according to Embodiment 1 in that light emission panel 30 itself does not emit light and is a diffuse transmitting panel.

Figure 8:
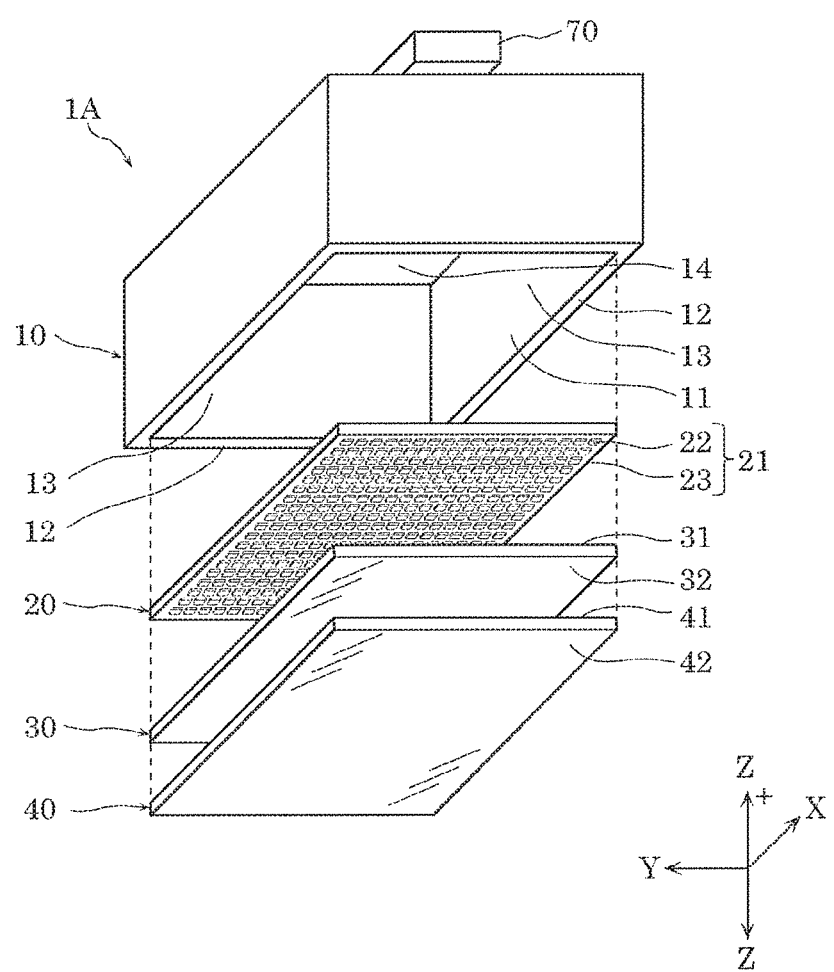
FIG. 8 is an exploded perspective view of a lighting apparatus according to Embodiment 2.

FIG. 8 is an exploded perspective view of lighting apparatus 1A according to Embodiment 2.

Lighting apparatus 1A includes: case 10; light source 20; light emission panel 30; light distribution modification panel 40; and controller 70. Correspondence to FIG. 1A described earlier is as follows: light emission panel 30 corresponds to color presentation panel 130 which transmits light emitted by a light source; and light distribution modification panel 40 corresponds to color presentation panel 140.

Light source 20, light emission panel 30, and light distribution modification panel 40 are housed in case 10. Light distribution modification panel 40 is disposed in opening portion 11 of case 10. Light emission panel 30 is disposed between light source 20 and light distribution modification panel 40. Light emission panel 30 and light distribution modification panel 40 are located opposite with a gap.

Light source 20 is configured with light emitting module 21 having board 23 and a plurality of light emitting elements 22 mounted on board 23. Light source 20 provides, for example, a video of a blue sky and flowing could by means of the plurality of light emitting elements 22 being under light emission control of controller 70.

Board 23 is a printed wiring board for mounting a plurality of light emitting elements 22, and is formed to be approximately rectangular. As board 23, for example, a resin board mainly made of a resin, a metal board mainly made of a metal, and ceramic board made of ceramic, or the like can be used.

The plurality of light emitting elements 22 are configured with LED elements. The plurality of light emitting elements 22 are arranged in a matrix at equal intervals on board 23. Each light emitting element 22 is disposed on a principal surface located opposite light distribution modification panel 30 out of the both principal surfaces of board 23. In other words, light source 20 is disposed such that light emitting elements 22 are located opposite light emission panel 30. In light source 20, light emitting module 21 is under light emission control of controller 70. In this way, light source 20 emits dynamically changing light of video or the like.

Light emission panel 30 is a diffuse transmitting panel which transmits and diffuses light emitted by light source 20 to emit the light toward the floor side. Light emission panel 30 includes incident surface 31 for receiving the light emitted from light source 20. Light emission panel 30 includes light emission surface 32 which diffuses the dynamically changing light emitted from light source 20 to emit the diffused light. The light emitted from light emission surface 32 is not plane light having an even distribution but light having a luminance distribution, a chromaticity distribution, or the like.

Light emission panel 30 is made by performing diffusion processing to a translucent panel made of one of a resin material and glass. The resin material is, for example, acryl, polyethylene terephthalate, or the like. The diffusion processing is performed on at least one of incident surface 31 and light emission surface 32 of light emission panel 30. Examples of diffusion processing include a prism forming process for forming a prism having fine dot-shaped holes (recessed portions). In addition, diffusion processing is not limited to the prism forming process, and may be one of emboss processing and printing. In addition, diffusion processing may be performed by diffusing a diffusing agent such as silicon oxide ($SiO_2$) particles onto one of a resin material and glass. A haze value of light emission panel 30 which has been subjected to the diffusion processing is, for example, 10% or more.

Light distribution modification panel 40 is a diffuse transmitting panel which transmits and diffuses light emitted from light emission panel 30 to emit the light toward the floor side. Light distribution modification panel 40 has a distribution-modified light emission surface 42 which modifies the light distribution of light emitted from light emission panel 30 and emits the light having the modified light distribution. The light distribution is, for example, one of a luminance distribution and a chromaticity distribution.

Light distribution modification panel 40 is made by performing diffusion processing to a translucent panel made of one of a resin material and glass. The resin material is, for example, acryl, polyethylene terephthalate, or the like. The diffusion processing is performed on at least one of incident surface 41 and distribution-modified light emission surface 42 of light distribution modification panel 40. Examples of diffusion processing include a prism forming process for forming a prism having fine dot-shaped holes (recessed portions). In addition, diffusion processing is not limited to the prism forming process, and may be one of emboss processing and printing.

A haze value of light distribution modification panel 40 which has been subjected to the diffusion processing is, for example, in a range from 10% to 90%. The haze value of light distribution modification panel 40 is smaller than a haze value of light emission panel 30. In other words, light distribution modification panel 40 has a diffusion rate lower than the diffusion rate of light emission panel 30.

Light distribution modification panel 40 receives, through incident surface 41, the light emitted from light emission surface 32 of light emission panel 30 and transmits and diffuses the incident light to emit the light. On light distribution modification panel 40 and light emission panel 30, light having a color similar to the color of light emitted by light emitting module 21 is presented. At this time, light distribution modification panel 40 diffuses and transmits the light emitted from light emission surface 32 to emit light such that one of the luminance distribution and the chromaticity distribution of the second image to be presented on distribution-modified light emission surface 42 is changed to a blurred state.

In lighting apparatus 1A according to Embodiment 2, light emission panel 30 and light distribution modification panel 40 are arranged to be opposite, which makes it possible to provide a depth to the target to be produced by the light having the luminance distribution on light emission surface 32 and the light having the luminance distribution on distribution-modified light emission surface 42. The luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to cause the user to feel as if the target to be produced by the light having the luminance distribution on light emission surface 32 and the light having the luminance distribution on distribution-modified light emission surface 42 were present far away, thereby producing a deep depth. Although the luminance distribution has been described above, it should be noted that the same applies to the chromaticity distribution.

Lighting apparatus 1A according to Embodiment 2 further includes: a plurality of light emitting elements 22; light source 20 which emits light to light emission panel 30; and controller 70 which controls light emission of the plurality of light emitting elements 22. Light emission panel 30 is a diffuse transmitting panel which diffuses and transmits the light emitted from light source 20 to emit the light toward light distribution modification panel 40. Controller 70 controls the light emission of the plurality of light emitting elements 22 so as to adjust the at least one of the luminance distribution and the chromaticity distribution of the first image to be presented on light emission surface 32.

Lighting apparatus 1A according to Embodiment 2 has light emission panel 30 as the diffusion transmitting panel, and thus is capable of diffusing and emitting light entered light emission surface 32. For this reason, it is difficult for the user to recognize the emission position of the light emitted from light emission surface 32 and the emission position of the light emitted from distribution-modified light emission surface 42. In this way, it is possible to allow the user to feel as if the target to be produced were present far away due to physiological factors and a psychological factor, thereby producing a deep depth.

Embodiment 3

Next, a configuration of lighting apparatus 1B according to Embodiment 3 is described. Lighting apparatus 1B differs from lighting apparatus 1A according to Embodiment 2 in that light emission panel 30 is a diffuse reflecting panel.

Figure 9:
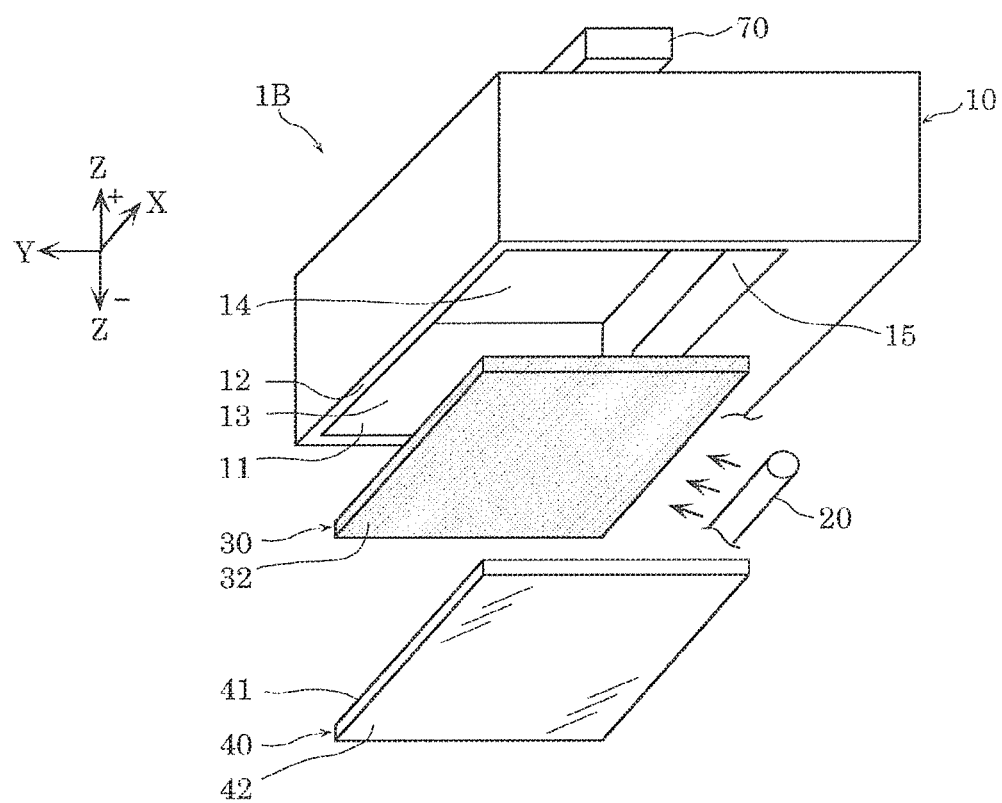
FIG. 9 is an exploded perspective view of a lighting apparatus according to Embodiment 3.

FIG. 9 is an exploded perspective view of lighting apparatus 1B according to Embodiment 3.

Lighting apparatus 1B includes: case 10; light source 20; light emission panel 30; light distribution modification panel 40; and controller 70. Correspondence to FIG. 1A described earlier is as follows: light emission panel 30 corresponds to color presentation panel 130 which transmits light emitted by a light source; and light distribution modification panel 40 corresponds to color presentation panel 140.

Light source 20, light emission panel 30, and light distribution modification panel 40 are housed in case 10. Light distribution modification panel 40 is disposed in opening portion 11 of case 10. Light emission panel 30 is disposed between bottom surface 14 of case 10 and light distribution modification panel 40. Light emission panel 30 and light distribution modification panel 40 are located opposite with a gap. Hollow portion 15 is formed in part of inner surface 13 of case 10. Light source 20 is housed in the space of hollow portion 15 such that light is emitted toward light emission panel 30.

Light source 20 is configured with a light emitting module having a board (not illustrated) and a plurality of light emitting elements mounted on the board. Light source 20 is one of a white light source which emits white light and a blue light source which emits blue light.

Light emission panel 30 is a diffuse reflecting panel which diffuses and reflects the light emitted from light source 20 to emit the light toward the floor side. Light emission panel 30 includes light emission surface 32 which diffuses dynamically changing light emitted from light source 20 to emit the light. The light emitted from light emission surface 32 is not plane light having an even distribution but light having a luminance distribution, a chromaticity distribution, or the like.

Light emission surface 32 of light emission panel 30 is colored in blue or substantially blue. Blue or substantially blue is a color which can be recognized as blue when a person sees light emission surface 32. Light emission panel 30 is formed with one of a stack in which fibers are stacked, and a paper-shaped stack or the like in which one of chemical fibers and cellulose fibers are stacked. Light emission surface 32 is a surface formed with such a stack. It is to be noted that light emission surface 32 may be a non-mirror material which allows diffusion of incident light, and is not limited to such a stack. For example, light emission surface 32 may be a surface formed by applying a resin material, a metal material, or the like to the surface of light emission panel 30, or a suede-like surface. In other words, light emission surface 32 is matt-finished so that incident light is diffused easily. In other words, light emission surface 32 is a non-polished matt-finished surface.

Light emission surface 32 is colored in blue. Light distribution modification panel 40 receives the blue light emitted from light emission surface 32, and transmits and diffuses the incident light to emit blue light which is the light having the modified light distribution. At this time, light distribution modification panel 40 diffuses and transmits the blue light emitted from light emission surface 32 to emit light such that one of the luminance distribution and the chromaticity distribution of the second image to be presented on distribution-modified light emission surface 42 is changed to a blurred state.

In lighting apparatus 1B according to Embodiment 3, light emission panel 30 and light distribution modification panel 40 are arranged to be opposite, which makes it possible to provide a depth to the target to be produced by the light having the luminance distribution on light emission surface 32 and the light having the luminance distribution on distribution-modified light emission surface 42. The luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to cause the user to feel as if the target to be produced by the light having the luminance distribution on light emission surface 32 and the light having the luminance distribution on distribution-modified light modification surface 42 were present far away, thereby producing a deep depth. Although the luminance distribution has been described above, it should be noted that the same applies to the chromaticity distribution.

Lighting apparatus 1B according to Embodiment 3 further includes light source 20 which emits light toward light emission panel 30. Light emission panel 30 is a diffuse reflecting panel which diffuses and reflects light emitted from light source 20 and emits the light toward light distribution modification panel 40.

Lighting apparatus 1B according to Embodiment 3 has light emission panel 30 as the diffusion transmitting panel, and thus is capable of diffusing and emitting light entered light emission surface 32. For this reason, it is further difficult for the user to recognize the emission position of the light to be emitted from light emission surface 32 and the emission position of the light to be emitted from distribution-modified light emission surface 42. In this way, the user focuses at a place farther than light emission surface 32, which makes it possible to cause the user to feel as if the target to be produced were present far away, thereby producing a deep depth.

In addition, light emission surface 32 may be colored in blue, light emission panel 30 may receive the light emitted from light source 20, and may emit blue light which is the light having the light distribution, and light distribution modification panel 40 may receive the blue light emitted from light emission surface 32, and may emit blue light which is the light having the modified light distribution.

In this way, when blue light is presented on light emission surface 32 and distribution-modified light emission surface 42, light emission surface 32 on which blue light is presented is present at the back surface side of distribution-modified light emission surface 42 on which the same blue light is presented. Thus, it is possible to provide a surrounding environment having a deep depth where blue light is continuous.

In addition, light emission panel 30 may include a stack in which a plurality of fibers are stacked. With this, it is possible to form light emission panel 30 using a generally used member.

In addition, light emission panel 30 may include a paper-shaped stack in which one of chemical fibers and cellulose fibers are stacked. With this, it is possible to form light emission panel 30 using a generally used member.

Embodiment 4

Next, a configuration of lighting apparatus 1C according to Embodiment 4 is described. Lighting apparatus 1C differs from lighting apparatus 1A according to Embodiment 2 in that light emission panel 30 is a light guide panel.

Figure 10:
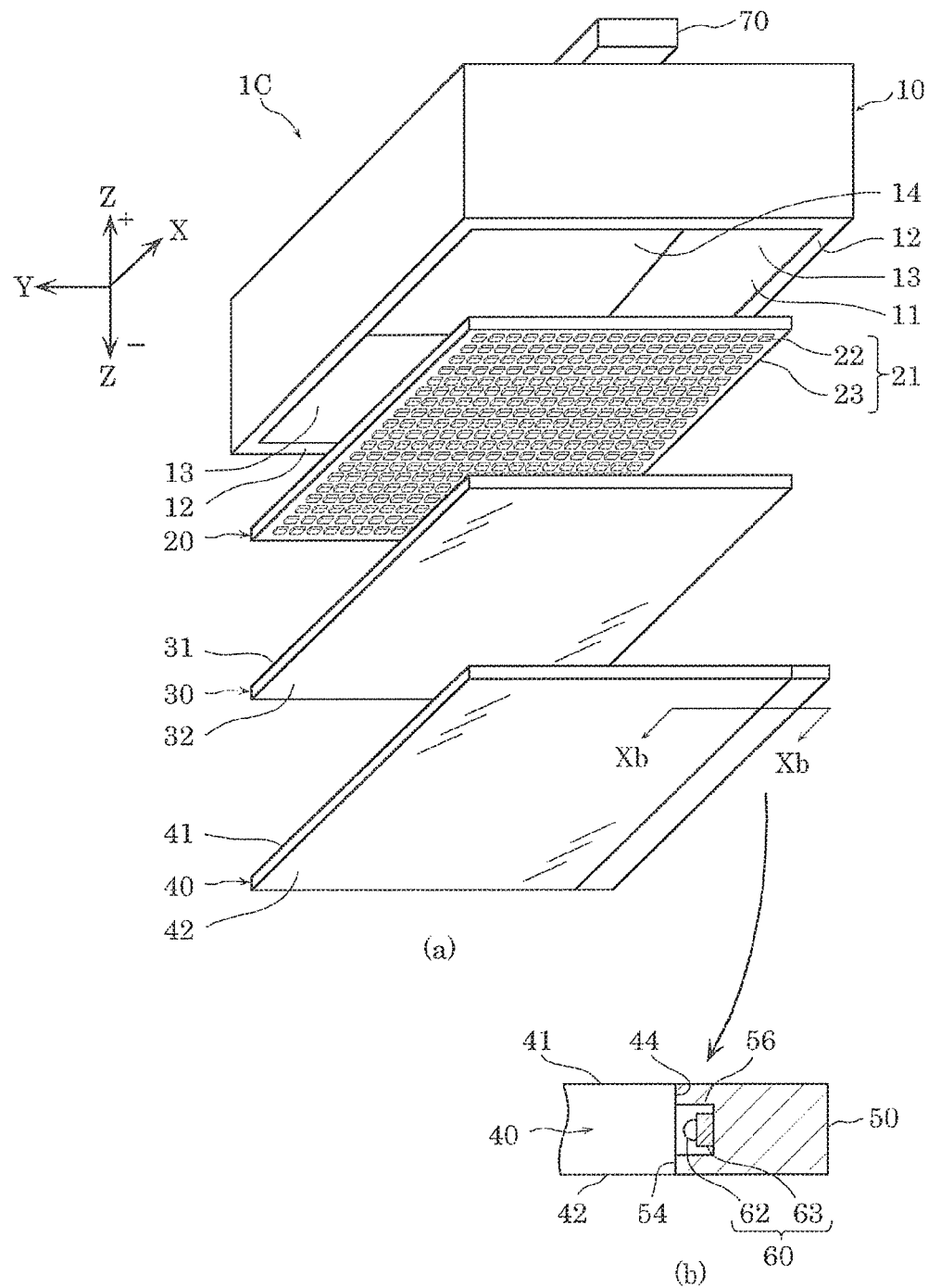
FIG. 10 is an exploded perspective view of a lighting apparatus according to Embodiment 4.

FIG. 10 is an exploded perspective view of lighting apparatus 1C according to Embodiment 4.

Lighting apparatus 1C includes: case 10; first light source 20; light emission panel 30; light distribution modification panel 40; second light source 60; and controller 70. Correspondence to FIG. 1A described earlier is as follows: light emission panel 30 corresponds to color presentation panel 130 which transmits and diffuses light; and light distribution modification panel 40 corresponds to color presentation panel 140 which transmits and diffuses light.

First light source 20, light emission panel 30, and light distribution modification panel 40 are housed in case 10. Light distribution modification panel 40 is disposed in opening portion 11 of case 10. Light emission panel 30 is disposed between light source 20 and light distribution modification panel 40. Light emission panel 30 and light distribution modification panel 40 are located opposite with a gap.

First light source 20 is configured with light emitting module 21 including board 23 and a plurality of light emitting elements 22 mounted on board 23. First light source 20 presents, for example, a video of a blue sky with flowing clouds by means of the plurality of light emitting elements 22 being under light emission control of controller 70.

The plurality of light emitting elements 22 are arranged in a matrix at equal intervals on board 23. Each light emitting element 22 is disposed on a principal surface located opposite light emission panel 30 out of the both principal surfaces of board 23. In other words, first light source 20 is disposed such that light emitting elements 22 are located opposite light emission panel 30. In first light source 20, light emitting module 21 is under light emission control of controller 70. In this way, first light source 20 emits dynamically changing light of video or the like.

Light emission panel 30 is a diffuse transmitting panel which transmits and diffuses light emitted by first light source 20 to emit the light toward the floor side. Light emission panel 30 includes incident surface 31 for receiving light emitted from first light source 20. Light emission panel 30 includes light emission surface 32 which diffuses dynamically changing light emitted from first light source 20 to emit the light. The light emitted from light emission surface 32 is not plane light having an even distribution but light having a luminance distribution, a chromaticity distribution, or the like.

Second light source 60 is a light emission source which emits light toward light distribution modification plate 40. Second light source 60 is an LED line module including board 63 and a plurality of light emitting elements 62 mounted on board 63. Board 63 is a printed wiring board for mounting the plurality of light emitting elements 62. Board 63 is formed to have an approximately rectangular elongated shape. As board 63, for example, a resin board mainly made of a resin, a metal board mainly made of a metal, and ceramic board made of ceramic, or the like can be used.

Second light source 60 is embedded in side member 50 provided on side surface 44 of light distribution modification panel 40. More specifically, side member 50 includes: inner surface 54 which is in contact with side surface 44 of light distribution modification panel 40; and recessed portion 56 provided in inner surface 54. Second light source 60 is disposed to be opposite side surface 44 of light distribution modification panel 40 in a state where second light source 60 is housed in recessed portion 56.

Light emitting elements 62 are configured with LED elements. The plurality of light emitting elements 62 are arranged in a matrix at equal intervals on board 63.

Light emitting element 62 is an LED element of an RGB type which emits light of three primary colors. Since light emitting elements 62 are LED elements of an RGB type, and thus are capable of emitting light having one of a predetermined luminance distribution and a predetermined chromaticity distribution. Light emitting elements 62 may be one of LED elements of an SMD type and LED elements of a COB type.

Light distribution modification panel 40 is a light guide panel which transmits and diffuses light emitted from light emission panel 30 to emit the light toward the floor side. Light distribution modification panel 40 has distribution-modified light emission surface 42 which modifies the light distribution of light emitted from light emission panel 30 to emit the light having the modified light distribution. The light distribution is, for example, one of a luminance distribution and a chromaticity distribution.

Light distribution modification panel 40 is a light guide panel of an edge light type having distribution-modified light emission surface 42. Light distribution modification panel 40 includes: incident surface 41 which is an opposite surface of distribution-modified light emission surface 42; and side surface 44 located opposite light emitting elements 62 of second light source 60. Light distribution modification panel 40 receives, on side surface 44, light emitted by second light source 60, and let the light pass through the light guide panel so that the light is emitted from distribution-modified light emission surface 42.

Light distribution modification panel 40 is made of one of a resin material and glass. The resin material is, for example, acryl, polyethylene terephthalate, or the like. Light distribution modification panel 40 may be translucent or non-translucent. Distribution-modified light emission surface 42 may have one of recessed portions and protruding portions in a matrix by printing or the like.

Light distribution modification panel 40 receives, through incident surface 41, light emitted from light emission surface 32 of light emission panel 30 and transmits and diffuses the incident light so that the light is emitted from distribution-modified light emission surface 42. On light distribution modification panel 40, light having a color similar to the color of light emitted by light emitting module 21 is presented through light emission panel 30. At this time, light distribution modification panel 40 diffuses and transmits light emitted from light emission surface 32 to emit light such that one of the luminance distribution and the chromaticity distribution of the second image to be presented on distribution-modified light emission surface 42 is changed to a blurred state.

Figure 11:
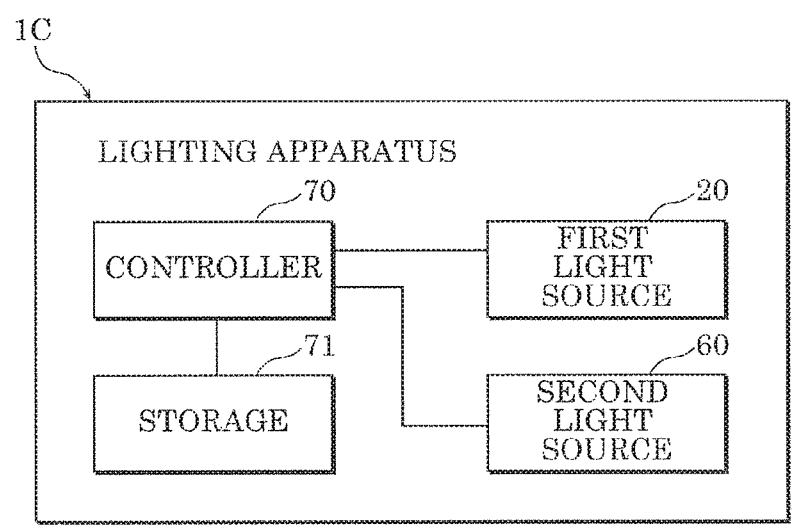
FIG. 11 is a block diagram of a control configuration of the lighting apparatus according to Embodiment 4.
Figure 12:
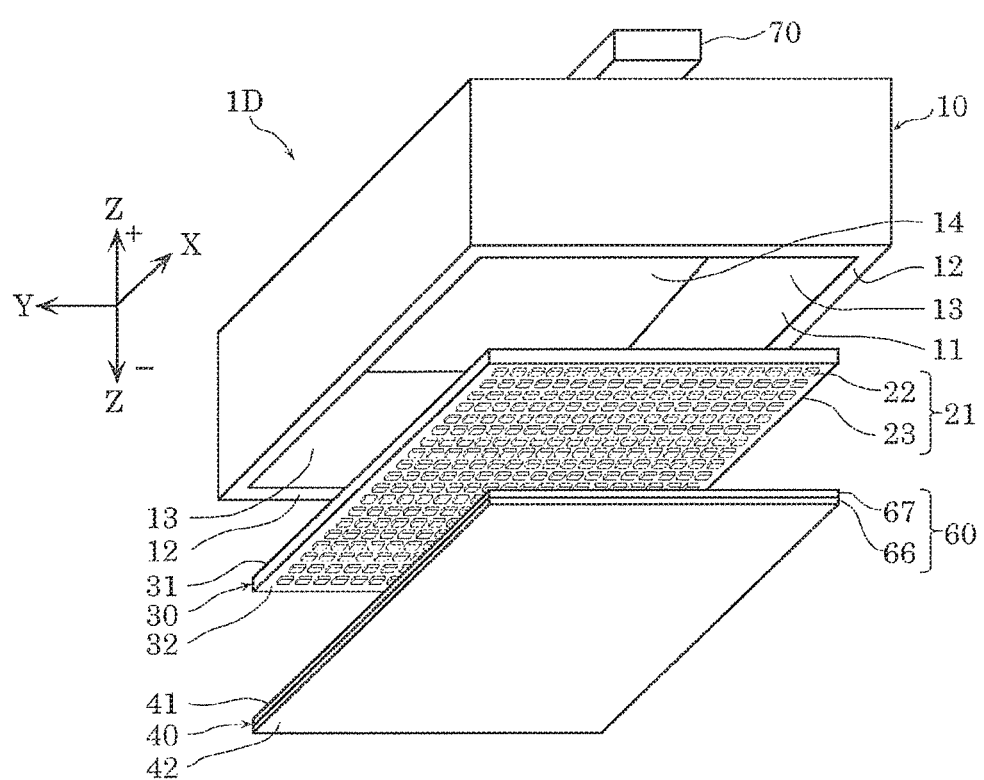
FIG. 12 is an exploded perspective view of a lighting apparatus according to a variation of Embodiment 4.

FIG. 11 is a block diagram of a control configuration of lighting apparatus 1C. Focusing on a control configuration of lighting apparatus 1C, lighting apparatus 1C includes: controller 70; and storage 71, first light source 20, and second light source 60 which are connected to controller 70.

Controller 70 controls operations such as turn-on, turn-off, dimming, and toning (adjustment of one of an emission color and a color temperature) of first light source 20 and second light source 60. Controller 70 is implemented as a microcomputer, a processor or the like, or an exclusive circuit.

Controller 70 obtains information related to an image stored in storage 71 and controls light emission of first light source 20 according to the information. For example, when a blue sky is presented on light distribution modification panel 40, controller 70 obtains information related to the blue sky from storage 71, and controls light emission of the plurality of light emitting elements 22 based on the obtained information. In addition, controller 70 controls light emission through light distribution modification panel 40 which is the light guide plate so that light having one of a luminance distribution and a chromaticity distribution in an appropriately blurred state can be emitted from light distribution modification panel 40 according to the light emitted from light emission panel 30. In this way, lighting apparatus 1C presents, on light distribution modification panel 40, an image of a blue sky, clouds, a cloudy sky, an evening sky, a falling sun, etc. by means of controller 70 controlling light emission of first light source 20 and second light source 60.

In lighting apparatus 1C according to Embodiment 4, light emission panel 30 and light distribution modification panel 40 are arranged to be opposite, which makes it possible to provide a depth to the target to be produced by the light having the luminance distribution on light emission surface 32 and the light having the luminance distribution on distribution-modified light emission surface 42. The luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to allow the user to feel as if the target to be produced were present far away due to physiological factors and a psychological factor, thereby producing a deep depth. Although the luminance distribution has been described above, it should be noted that the same applies to the chromaticity distribution.

In addition, lighting apparatus 1C according to Embodiment 4 may include: first light source 20 which presents at least one of the luminance distribution and the chromaticity distribution on light emission surface 32; and second light source 60 which presents a modified one of the at least one of the luminance distribution and the chromaticity distribution on distribution-modified light emission surface 42.

In this way, lighting apparatus 1C includes second light source 60, and thus is capable of adjusting one of the brightness and color of light on light distribution modification panel 40. The luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to cause the user to feel as if the target to be produced were present far away, thereby producing a deep depth.

Variation of Embodiment 4

Lighting apparatus 1D according to a variation of Embodiment 4 includes light distribution modification panel 40 having an organic electro-luminescent (EL) element. Light emitting element which is the organic EL element is configured with three types of light emitting elements each having a pixel, which are a red light emitting element, a green light emitting element, and a blue light emitting element. The plurality of light emitting elements are arranged in a matrix in the direction along distribution-modified light emission surface 42. It should be noted that the organic EL element may include a pixel, or may have a light emission surface the entire of which has a color that is changeable between red, green, and blue, instead of including a pixel.

The light emitting element has a stacked structure in which thin film transistor (TFT) board 67 and EL device portion 66 are stacked.

TFT board 67 includes: a glass board; and a TFT and signal lines formed on the glass board. Signal lines are power supply lines for driving the TFT. TFT is a semiconductor element which controls current to be supplied to EL device portion 66.

EL device portion 66 has a stacked structure in which an anode, a hole injection layer, a light emitting layer, an electron injection layer, and a cathode are stacked. The hole injection layer, the light emitting layer, and the electron injection layer of a light emitting element are divided from the hole injection layer, the light emitting layer, and the electron injection layer of an adjacent light emitting element by not-illustrated barrier walls (banks). The anode for reflecting light emitted by the light emitting layer is provided below the hole injection layer. The cathode for transmitting the light emitted by the light emitting layer is provided above the electron injection layer.

A direct voltage when applied between the anode and the cathode re-couples, in the light emitting layer, holes injected from the hole injection layer and electrons injected from the electron injection layer. Energy generated through the re-coupling excites light emitting materials in the light emitting layer to cause emission of light.

In this way, lighting apparatus 1D according to this variation includes second light source 60, and thus is capable of adjusting one of the brightness and color of light on light distribution modification panel 40. For this reason, the luminance distribution of the first image presented on light emission surface 32 is changed to a blurred state and the blurred luminance distribution of the second image is presented on distribution-modified light emission surface 42, which makes it possible to obscure the difference between the emission position of light to be emitted from light emission surface 32 and the emission position of light to be emitted from distribution-modified light emission surface 42. In this way, it is possible to cause the user to feel as if the target to be produced were present far away, thereby producing a deep depth.

Embodiment 5

Figure 13:
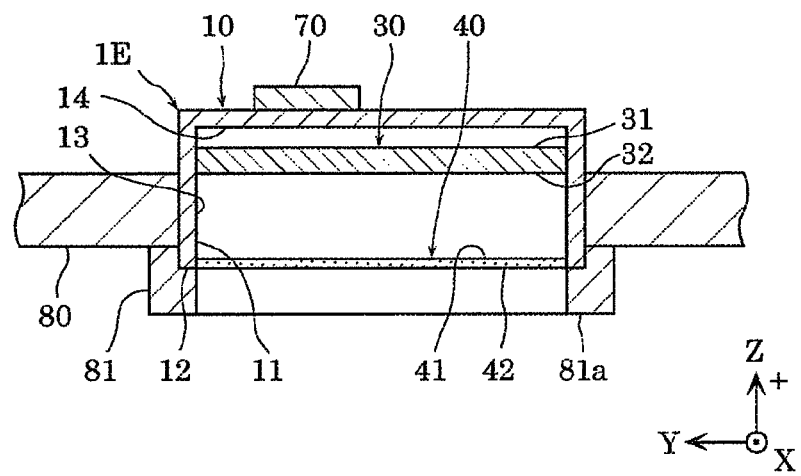
FIG. 13 is a cross sectional view of a lighting apparatus according to Embodiment 5.
Figure 14:
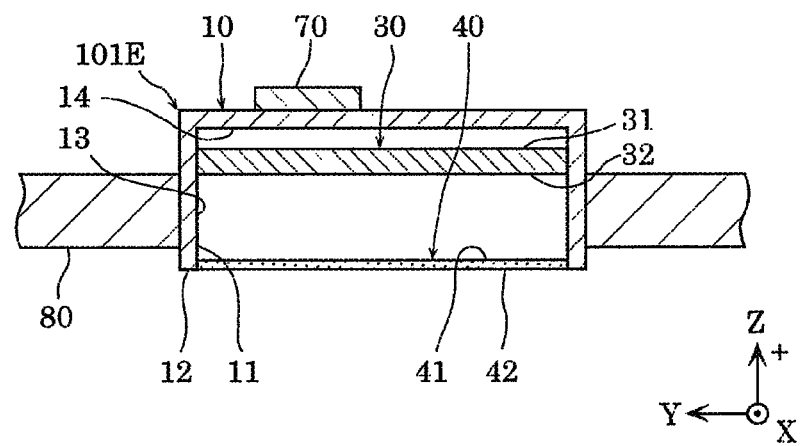
FIG. 14 is a cross sectional view of a lighting apparatus according to a comparative example.

FIG. 13 is a cross sectional view of lighting apparatus 1E according to Embodiment 5. FIG. 14 is a cross sectional view of lighting apparatus 101E according to a comparative example.

In Embodiment 5, frame body 81 is provided on ceiling 80 of a building, and lighting apparatus 1E is provided inside frame body 81. More specifically, frame body 81 which protrudes inwardly from the surface of ceiling 80 of the building is provided. In addition, case 10 of lighting apparatus 1E is provided inside frame body 81. Frame body 81 is rectangular and disposed to surround the side surface of case 10. Light distribution modification panel 40 of lighting apparatus 1E is disposed in an area located outside protruding tip 81a of frame body 81.

Lighting apparatus 101E according to the comparative example does not include frame body 81 provided on ceiling 80, and light distribution modification panel 40 of lighting apparatus 101E is disposed to protrude inwardly from the surface of ceiling 80. Thus, lighting apparatus 101E is configured such that light distribution modification panel 40 on which light is presented is present closer than ceiling 80. This configuration makes it difficult for the user to feel a depth.

In contrast, lighting apparatus according to Embodiment 5 is configured such that light distribution modification panel 40 is located outside than protruding end portion 81a of frame body 81. Accordingly, even when light distribution modification panel 40 is disposed inside the surface of ceiling 80, a user can feel the depth of an image on light distribution modification panel 40 without laboring.

OTHER EMBODIMENTS

Although the present disclosure has been described based on embodiments, the present disclosure is not limited to the above embodiments.

Although an example of presenting an image of a blue sky on light distribution modification panel 40 has been provided in Embodiment 1, images which can be presented on light distribution modification panel 40 are not limited thereto. For example, the image may be one of an image of a blue sky with clouds and an image of an evening sky with a falling sun presented on light distribution modification panel 40. Alternatively, one of a video in which clouds are moving in a blue sky and a video in which the sun is falling in an evening sky is also possible.

An example of mounting lighting apparatus 1 on ceiling 80 has been described in Embodiment 1, as a non-limiting example. For example, lighting apparatus 1 may be provided on a wall which is an example of a building component. For example, lighting apparatus 1 may be provided on the wall such that light distribution modification panel 40 is located outside the inner wall surface of the wall.

Although an example of using two diffuse transmitting panels as light emission panel 30 and light distribution modification panel 40 has been described in Embodiment 2, the number of diffuse transmitting panels is not limited to two. In other words, one or more diffuse transmitting panels may be included in addition to light emission panel 30 and light distribution modification panel 40.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus, comprising:
    a case having an opening portion;
    a light emission panel provided in the case, the light emission panel having a light emission surface which emits light having a light distribution which dynamically changes; and
    a light distribution modification panel provided in the opening portion to be located opposite the light emission panel, the light distribution modification panel having a distribution-modified light emission surface which modifies the light distribution of the light emitted from the light emission surface to emit light having a modified light distribution;
    wherein the light emission panel emits, as the light having the light distribution, light having at least one of a luminance distribution and a chromaticity distribution of a first image to be presented on the light emission surface, and
    the light distribution modification panel diffuses and transmits the light emitted from the light emission surface to emit light such that the at least one of the luminance distribution and the chromaticity distribution of a second image to be presented on the distribution-modified light emission surface is changed to a blurred state.

2. The lighting apparatus according to claim 1,
    wherein the light emission panel emits the light having the luminance distribution out of the luminance distribution and the chromaticity distribution of the first image to be presented on the light emission surface,
    the light distribution modification panel emits the light such that the luminance distribution of the second image to be presented on the distribution-modified light emission surface is changed to the blurred state, and
    a difference between a largest value and a smallest value of luminance of the second image to be presented on the distribution-modified light emission surface is smaller than a difference between a largest value and a smallest value of luminance of the first image to be presented on the light emission surface.

3. The lighting apparatus according to claim 1,
    wherein the light emission panel emits the light having the chromaticity distribution out of the luminance distribution and the chromaticity distribution of the first image to be presented on the light emission surface,
    the light distribution modification panel emits the light such that the chromaticity distribution of the second image to be presented on the distribution-modified light emission surface is changed to the blurred state, and
    a difference in chrominance of the second image to be presented on the distribution-modified light emission surface is smaller than a difference in chrominance of the first image to be presented on the light emission surface.

4. The lighting apparatus according to claim 1,
    wherein the light emitted from the distribution-modified light emission surface has a color similar to a color of the light emitted from the light emission surface.

5. The lighting apparatus according to claim 1,
    wherein the light emission panel includes a plurality of light emitting elements,
    the lighting apparatus further comprises a controller which controls light emission of the plurality of light emitting elements, and
    the controller controls the light emission of the plurality of light emitting elements so as to adjust the at least one of the luminance distribution and the chromaticity distribution of the first image to be presented on the light emission surface.

6. The lighting apparatus according to claim 1, further comprising:
    a plurality of light emitting elements;
    a light source which emits light to the light emission panel; and
    a controller which controls light emission of the plurality of light emitting elements,
    wherein the light emission panel is a diffuse transmitting panel which diffuses and transmits the light emitted from the light source to emit the light toward the light distribution modification panel, and
    the controller controls the light emission of the plurality of light emitting elements so as to adjust the at least one of the luminance distribution and the chromaticity distribution of the first image to be presented on the light emission surface.

7. The lighting apparatus according to claim 1, further comprising:
    a light source which emits light to the light emission panel,
    wherein the light emission panel is a diffuse reflecting panel which diffuses and reflects the light emitted from the light source to emit the light toward the light distribution modification panel.

8. The lighting apparatus according to claim 7,
    wherein the light emission surface is colored in blue,
    the light emission panel receives the light emitted from the light source, and emits blue light which is the light having the light distribution, and
    the light distribution modification panel receives the blue light emitted from the light emission surface, and emits blue light which is the light having the modified light distribution.

9. The lighting apparatus according to claim 7,
    wherein the light emission panel includes a stack in which a plurality of fibers are stacked.

10. The lighting apparatus according to claim 7,
    wherein the light emission panel includes a paper-shaped stack in which one of chemical fibers and cellulose fibers are stacked.

11. The lighting apparatus according to claim 6,
wherein the light source includes:
a first light source which presents at least one of the luminance distribution and the chromaticity distribution on the light emission surface; and
a second light source which presents a modified one of the at least one of the luminance distribution and the chromaticity distribution on the distribution-modified light emission surface.

12. The lighting apparatus according to claim 1,
wherein the case is disposed on one of a ceiling and a wall of a building, and
the light distribution modification panel is disposed in one of a surface of the ceiling and at an area located outside an inner wall surface of the wall.

13. The lighting apparatus according to claim 1,
wherein the case is disposed inside a frame body which protrudes inwardly from one of a ceiling and a wall of a building, and
the light distribution modification panel is disposed in an area located outside a protruding tip of the frame body.

* * * * *